(12) United States Patent
Ogura

(10) Patent No.: US 7,822,949 B2
(45) Date of Patent: Oct. 26, 2010

(54) COMMAND SUPPLY DEVICE THAT SUPPLIES A COMMAND READ OUT FROM A MAIN MEMORY TO A CENTRAL PROCESSING UNIT

(75) Inventor: Satoshi Ogura, Kyoto (JP)

(73) Assignee: Panasonic Corporation, Osaka (JP)

( * ) Notice: Subject to any disclaimer, the term of this patent is extended or adjusted under 35 U.S.C. 154(b) by 216 days.

(21) Appl. No.: 11/720,011

(22) PCT Filed: May 9, 2005

(86) PCT No.: PCT/JP2005/008429

§ 371 (c)(1),
(2), (4) Date: May 23, 2007

(87) PCT Pub. No.: WO2006/057084

PCT Pub. Date: Jun. 1, 2006

(65) Prior Publication Data

US 2008/0086621 A1    Apr. 10, 2008

(30) Foreign Application Priority Data

Nov. 25, 2004   (JP) .............................. 2004-340660

(51) Int. Cl.
*G06F 7/38*    (2006.01)
*G06F 9/00*    (2006.01)
*G06F 9/44*    (2006.01)

(52) U.S. Cl. ..................... 712/205; 712/241; 712/235

(58) Field of Classification Search ................. 712/205, 712/214, 219, 235, 241
See application file for complete search history.

(56) References Cited

U.S. PATENT DOCUMENTS 4,626,988 A * 12/1986 George ..................... 712/241
5,113,370 A    5/1992 Tomita (Continued)

FOREIGN PATENT DOCUMENTS

JP         59-052349        3/1984

(Continued)

OTHER PUBLICATIONS

English Language partial translation of JP 59-052349 A.

(Continued)

*Primary Examiner*—Alford W Kindred
*Assistant Examiner*—Jesse R Moll
(74) *Attorney, Agent, or Firm*—Greenblum & Bernstein, P.L.C.

(57) ABSTRACT

A command supply device supplies a command sequence that forms a loop. A loop command buffer accumulates a first partial command sequence. The first partial command sequence is a head part of a first command sequence repeatedly supplied to a CPU from among command sequences stored in a main memory, and is accumulated before the first command sequence is supplied to the CPU again. A linking command buffer accumulates a second partial command sequence. The second partial command sequence follows the first partial command sequence in the first command sequence, and is accumulated while the accumulated first partial command sequence in the loop command buffer is supplied to the CPU. A selection circuit supplies, to the CPU, a command from the accumulated second partial command sequence in the linking command buffer when the entirety of the first partial command sequence has been supplied to the CPU.

7 Claims, 12 Drawing Sheets

U.S. PATENT DOCUMENTS

| | | | |
|---|---|---|---|
| 6,766,444 B1 * | 7/2004 | Singh et al. | 712/241 |
| 6,898,693 B1 | 5/2005 | Singh et al. | |
| 6,959,379 B1 * | 10/2005 | Wojcieszak et al. | 712/241 |
| 2002/0116579 A1 | 8/2002 | Goodhue et al. | |
| 2003/0065905 A1 | 4/2003 | Ishii | |
| 2004/0003202 A1 * | 1/2004 | Ukai | 712/205 |

FOREIGN PATENT DOCUMENTS

| | | |
|---|---|---|
| JP | 59-052349 A | 3/1984 |
| JP | 63-314644 | 12/1988 |
| JP | 1-169633 | 7/1989 |
| JP | 2004-513427 | 4/2004 |
| WO | 02/37271 | 5/2002 |

OTHER PUBLICATIONS

English Language Abstract of JP 59-052349.
English Language Abstract of JP 63-314644.
English Language Abstract of JP 1-169633.

* cited by examiner

COMMAND SUPPLY DEVICE THAT SUPPLIES A COMMAND READ OUT FROM A MAIN MEMORY TO A CENTRAL PROCESSING UNIT

TECHNICAL FIELD

The present invention relates to a command supply device that is located between a main memory and a central processing unit and that supplies to the central processing unit a command read from the main memory, and relates in particular to a command supply device that, when commands are to be supplied repeatedly by a loop, can supply the commands even when access to the main memory is omitted.

BACKGROUND ART

Conventionally, there has been used a command supply device that is located between a main memory and a central processing unit and supplies to the central processing unit a command read out from the main memory.

In order to supply to the central processing unit a command read out from the main memory, the command supply device includes a loop command buffer and a normal command buffer. Then, when commands of a loop block are to be supplied, access to the main memory is omitted so that the commands are supplied from the loop command buffer to the central processing unit (see, for example, Patent Document 1).

The "loop command buffer" indicates a buffer which accumulates a loop block.

The "loop block" indicates a command sequence repeatedly supplied by a loop.

The "normal command buffer" indicates a buffer which accumulates a normal block.

The "normal block" indicates a command sequence other than the loop block.

Patent Document 1: Japanese Laid-Open Patent Publication No. 63-314644

DISCLOSURE OF INVENTION

Problems that Invention is to Solve

Nevertheless, in the conventional art, commands of a loop block are supplied only by a loop command buffer. Thus, when the loop block is composed of a large number of commands, it is necessary to secure a sufficiently large capacity in the loop command buffer in advance. Accordingly, the large capacity of the loop command buffer causes a problem of an increase in the amount of hardware. Further, when plural loop command buffers are provided in order to process plural loops, a problem of an increase in the amount of hardware appears more obviously.

The present invention has been devised in view of the above-mentioned problem, and has an object to provide a command supply device that supplies efficiently in a small amount of hardware a command sequence that forms a loop.

Means to Solve the Problems

In order to achieve the above-mentioned object, the command supply device according to the present invention is (a) a command supply device that supplies to a central processing unit a command read out from a main memory, the device including (b) a first buffer in which the command supply device accumulates a first partial command sequence that is a head part of a first command sequence repeatedly supplied to the central processing unit from among command sequences stored in the main memory, before supplying the first command sequence to the central processing unit again; (c) a second buffer in which the command supply device accumulates a second partial command sequence that follows the first partial command sequence while supplying the first partial command sequence accumulated in the first buffer to the central processing unit, when repeatedly supplying the first command sequence to the central processing unit; and (d) a selection unit which supplies to the central processing unit a command that follows the first partial command sequence from the second partial command sequence accumulated in the second buffer, in the case where the entirety of the first partial command sequence has been supplied to the central processing unit. Here, a first command is stored in the main memory, the first command including a location of the first command sequence and information for identifying the first partial command sequence as a command sequence to be accumulated in the first buffer, and the command supply device further receives an instruction based on the information included in the first command from the central processing unit which has executed the first command, and accumulates the first partial command sequence into the first buffer.

Thus, in comparison with the case where a command sequence of a loop block is accumulated into a single buffer, the command sequence can be divided and accumulated into two or more buffers. Accordingly, unless such buffers are all updated, the command sequence accumulated in the buffer without being updated can be re-used. Further, when a latter half of a loop is stored into a buffer in the background during the loop execution, even when the entire loop is not always held in the buffer, the condition becomes equivalent to a state that the entirety is being held in the buffer at the time of looping, allowing an efficient command supply.

For example, when commands of eight words are divided into half and accumulated respectively into two buffers, if only one buffer is updated and the other buffer is not updated, the un-updated commands of four words accumulated in the other buffer can be re-used. That is, it is sufficient to read out only the updated commands of four words from the main memory without reading out commands of eight words from the main memory again, so that the time of accessing the main memory can be shortened.

Alternatively, (a) the command supply device may further include (b) a third buffer in which the command supply device accumulates a third partial command sequence that is a head part of a second command sequence repeatedly supplied to the central processing unit other than the first command sequence from among the command sequences stored in the main memory, before supplying the second command sequence to the central processing unit again, (c) wherein the command supply device may accumulate into said second buffer a fourth partial command sequence that follows the third partial command sequence while supplying the third partial command sequence accumulated in the third buffer to the central processing unit, when repeatedly supplying the second command sequence to the central processing unit, and (d) the selecting unit may supply to the central processing unit a command that follows the third partial command sequence from the fourth partial command sequence accumulated in the second buffer, in the case where the entirety of the third partial command sequence has been supplied to the central processing unit. Here, a second command is stored in the main memory, the second command including a location of the second command sequence and information for identifying the third partial command sequence as a command sequence to be accumulated in said third buffer, and the command supply device further receives an instruction based on the information included in the second command from the central processing unit which has executed the second command, and accumulate the third partial command sequence into the third buffer.

This permits shared use between the buffer used when the second command sequence other than the first command sequence that forms a loop is supplied and the buffer that accumulates a partial command sequence linked with the partial command sequence which is the head part of the first command sequence. In this case, a command sequence composed of a larger number of commands can efficiently be supplied without addition of a buffer.

Here, in addition to the implementation as a command supply device, the present invention may be also implemented as a method or the like of controlling a command supply device (referred to as a command supply method, hereinafter). Further, the present invention may be implemented as: an LSI into which the function provided by the command supply device (referred to as a command supply function, hereinafter) is incorporated; an IP core (referred to as a command supply core, hereinafter) in which the command supply function is configured as a programmable logic device such as an FPGA or a CPLD; and a recording medium in which the command supply core is recorded.

EFFECTS OF THE INVENTION

As described above, according to the command supply device of the present invention, even for a loop block larger than the capacity of a loop command buffer, access to the main memory can be omitted so that the commands can be supplied efficiently. When plural loop command buffers are provided, an increase in the amount of hardware can be suppressed. Furthermore, since access to the main memory is omitted, access waiting required for the main memory is avoided, and the performances of execution processing in the central processing unit can be improved. This reduces access frequency to the main memory, and suppresses an increase in the power consumption.

NUMERICAL REFERENCES

Figure 1:
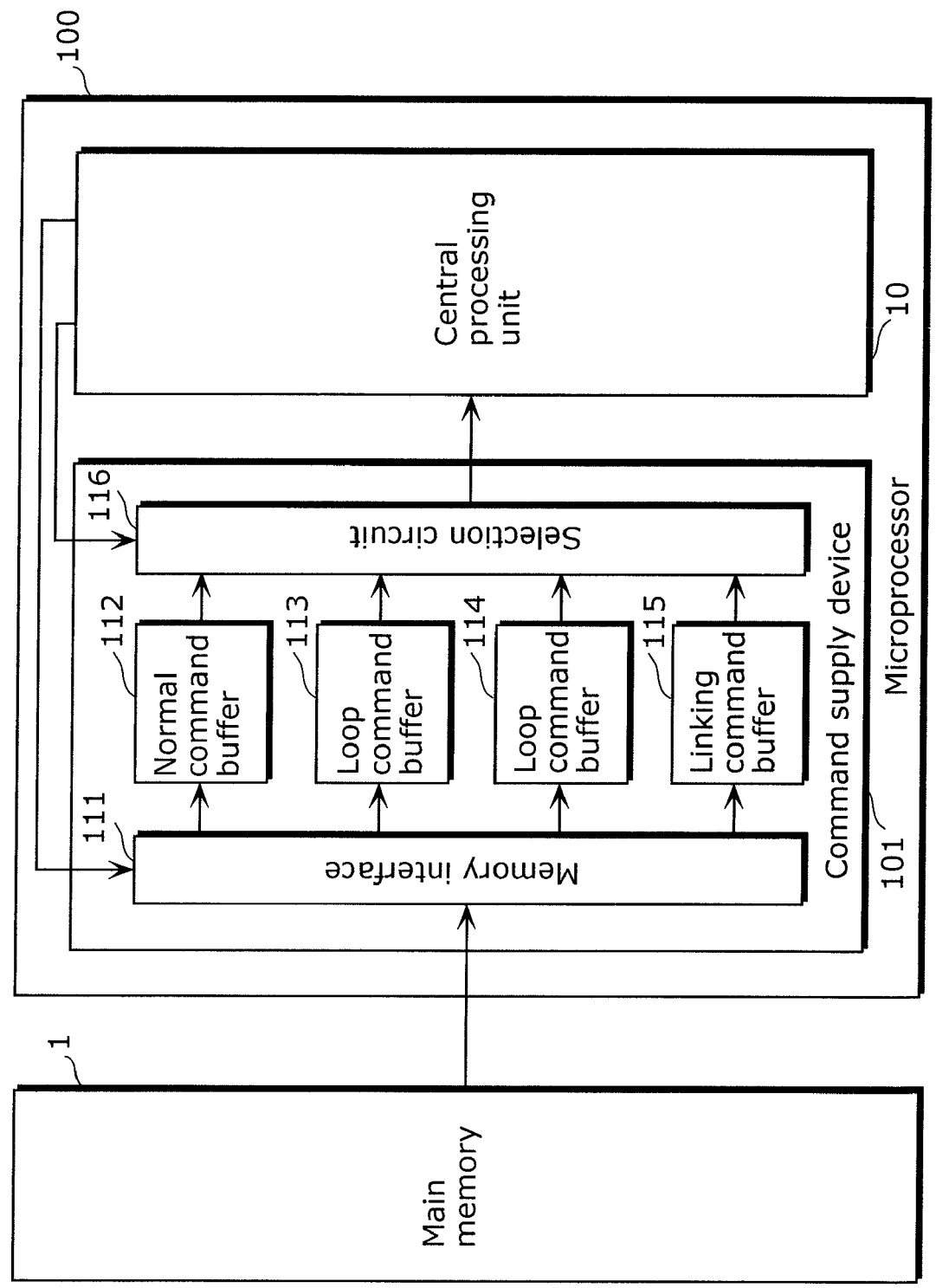
FIG. 1 is a diagram showing a configuration of a command supply device according to first embodiment.

1 Main memory
10, 20 Central processing unit
100,200 Microprocessor
101,201 Command supply device
111,211 Memory interface
112,212 Normal command buffer
113 Loop command buffer
114 Loop command buffer
115 Linking command buffer
116,216 Selection circuit
213 Threshold register

BEST MODE FOR CARRYING OUT THE INVENTION

First Embodiment

First embodiment of the present invention is described below with reference to the drawings.

With previously accumulating commands read from a main memory into a buffer via a memory interface, a command supply device according to the first embodiment of the present invention supplies to a central processing unit the commands from a command sequence accumulated in the buffer. At this time, a command sequence (referred to as a normal block, hereinafter) other than a command sequence (referred to as a loop block, hereinafter) from which commands are repeatedly supplied by a loop is accumulated into a normal command buffer. Further, a loop block is divided and accumulated respectively into a loop command buffer and a linking command buffer. Then, when the commands of the loop block are supplied to the central processing unit, a command sequence generated by linking the command sequences accumulated in the loop command buffer and the linking command buffer is supplied to the central processing unit.

The "normal block" is a block other than a loop block among command sequences stored in the main memory.

The "loop block" is a block in which commands to be executed repeatedly are stored, from among command sequences stored in the main memory.

Based on the above, the command supply device according to the first embodiment of the present invention is described below.

First, the configuration of the command supply device according to the first embodiment is described.

As shown in FIG. 1, in response to an instruction of a central processing unit 10 installed together in a microprocessor 100, a command supply device 101 reads out a command from a main memory 1 connected to the microprocessor 100, and supplies the read-out command to the central processing unit 10. Here, as an example, the command supply device 101 has a memory interface 111, a normal command buffer 112, a loop command buffer 113, a loop command buffer 114, a linking command buffer 115, a selection circuit 116 and the like.

In response to the instruction from the central processing unit 10, the memory interface 111 reads out a command from the main memory 1, and accumulates the read-out command into any one of the normal command buffer 112, the loop command buffer 113, the loop command buffer 114, and the linking command buffer 115.

The normal command buffer 112 is a buffer that accumulates four words of the commands read out from a normal block.

The loop command buffer 113 is a buffer that accumulates four words of the commands read out from a loop block.

The loop command buffer 114 is a buffer that accumulates four words of the commands read out from a loop block.

The linking command buffer 115 is linked with any one of the loop command buffer 113 and the loop command buffer 114. When linked with the loop command buffer 113, the linking command buffer 115 accumulates four words of the commands which follow the command sequence accumulated in the loop command buffer 113. When linked with the loop command buffer 114, the linking command buffer 115 serves as a buffer that accumulates four words of the commands which follow the command sequence accumulated in the loop command buffer 114.

In response to the instruction from the central processing unit 10, the selection circuit 116 selects as a command supply source any one of the normal command buffer 112, the loop command buffer 113, the loop command buffer 114, and the linking command buffer 115.

The processing of fetching a command from the main memory in the command supply device according to the first embodiment is described below.

Figure 2:
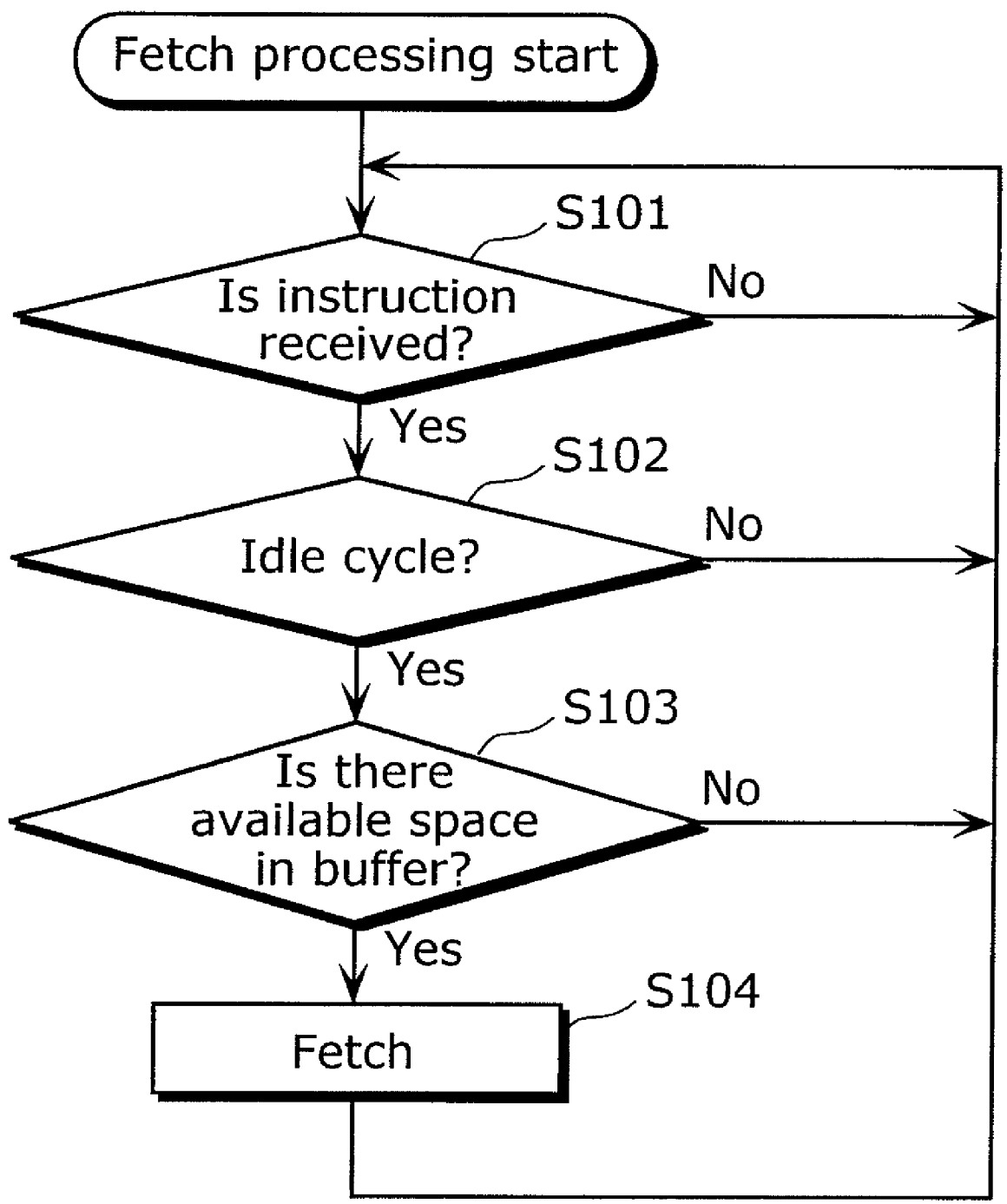
FIG. 2 is a diagram showing a process of fetching a command from a main memory in a command supply device according to the first embodiment.

As shown in FIG. 2, when an instruction is received from the central processing unit 10 (step S101: Yes), in an idle cycle (step S102: Yes), when there is an available space in a buffer specified from among the normal command buffer 112, the loop command buffers 113 and 114, and the linking command buffer 115 (step S103: Yes), the command supply device 101 fetches a command from the main memory 1 (step S104).

Here, the buffers that are not specified by the instruction are in an instruction waiting state.

The operations of the central processing unit 10 and the command supply device 101 are described below.

Figure 3:
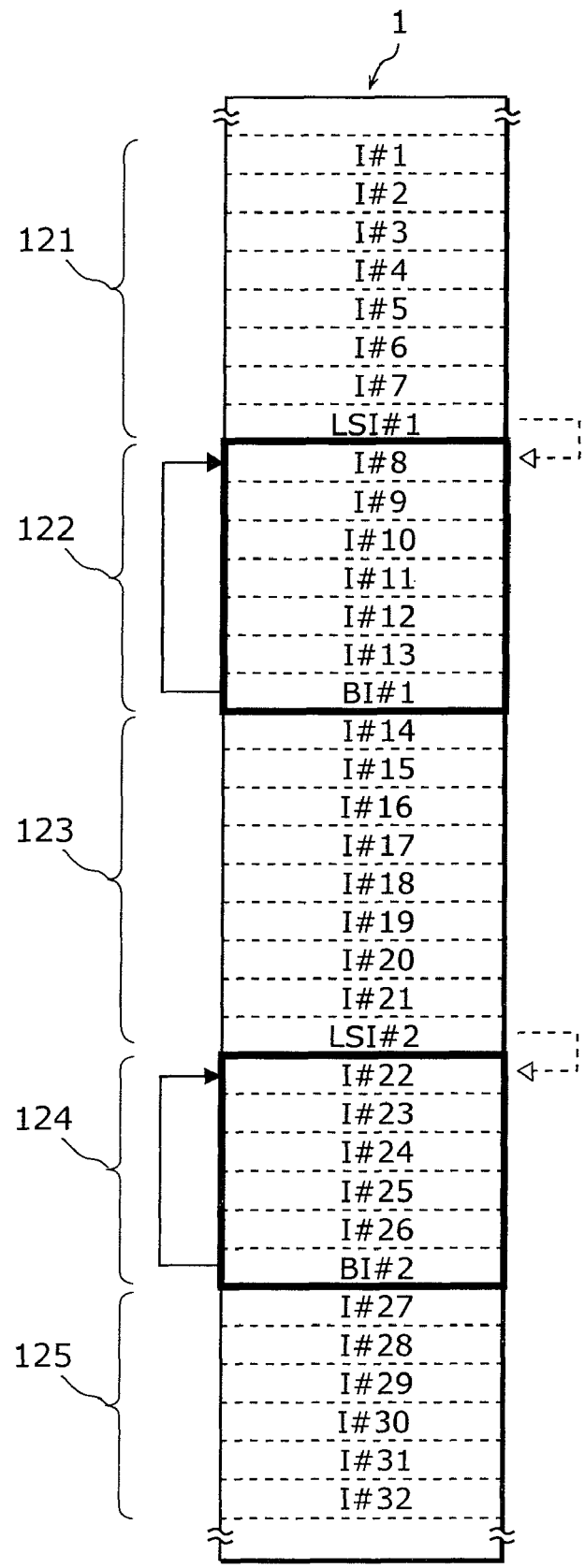
FIG. 3 is a diagram showing an example of a command sequence stored in the main memory.
Figure 4A:
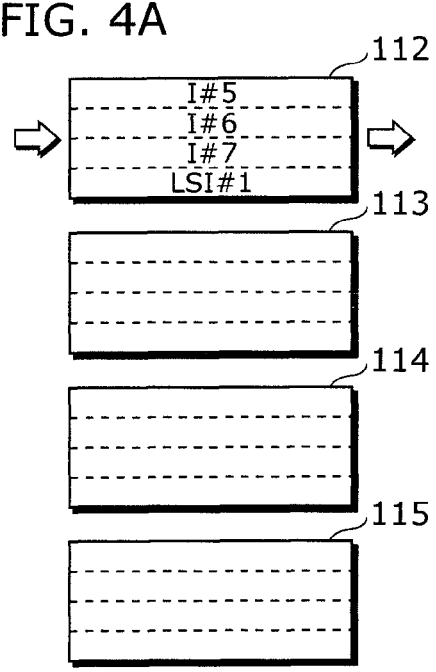
FIG. 4A is a first diagram showing an exemplary operation of the command supply device according to the first embodiment.
Figure 4B:
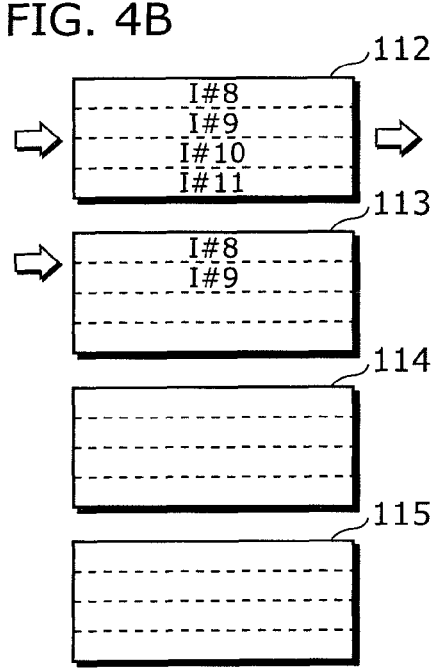
FIG. 4B is a second diagram showing an exemplary operation of the command supply device according to the first embodiment.
Figure 4C:
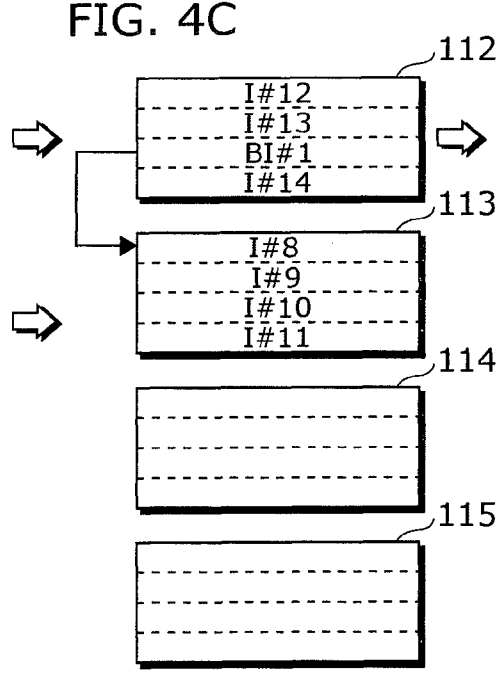
FIG. 4C is a third diagram showing an exemplary operation of the command supply device according to the first embodiment.
Figure 4D:
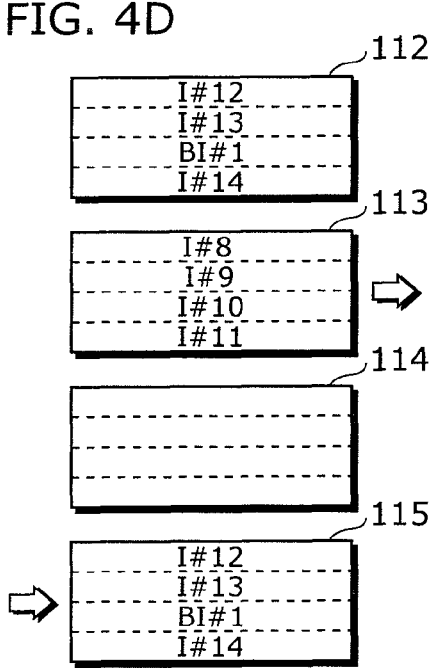
FIG. 4D is a fourth diagram showing an exemplary operation of the command supply device according to the first embodiment.

Here, the following description is given for an exemplary case that the command sequence stored in the main memory 1 is a command sequence made up of normal blocks 121, 123, and 125 and loop blocks 122, and 124 as shown in FIG. 3.

The normal block 121 is made up of a command sequence arranged from the top to the bottom (I#1 to I#7, LSI#1).

I#1 to I#7 are commands other than a loop store command and a branch command.

LSI#1 is a loop store command indicating that the loop block 122 starts at I#8.

The loop block 122 is made up of a command sequence arranged from the top to the bottom (I#8 to I#13, BI#1).

I#8 to I#13 are commands other than a loop store command and a branch command.

BI#1 is a conditional branch command of branching to I#8.

The normal block 123 is made up of a command sequence arranged from the top to the bottom (I#14 to I#21, LSI#2).

I#14 to I#21 are commands other than a loop store command and a branch command.

LSI#2 is a loop store command indicating that the loop block 124 starts at I#22.

The loop block 124 is made up of a command sequence arranged from the top to the bottom (I#22 to I#26, BI#2).

I#22 to I#26 are commands other than a loop store command and a branch command.

BI#2 is a conditional branch command of branching to I#22.

The normal block 125 is made up of a command sequence arranged from the top to the bottom (I#27 to I#32).

I#27 to I#32 are commands other than a loop store command and a branch command.

The "loop store command" is a command indicating that a loop block starts at an address identified by "label", for example, as shown in the following command.

[Command] Loopstore label, buff

Here, a buffer for accumulating the commands read out from the loop block is specified by the buff value. Here, when the buff value is 0, the commands are accumulated into the loop command buffer 113. When the buff value is 1, the commands are accumulated into the loop command buffer 114.

Note that, as for LSI#1, when the buff value is 0, the central processing unit 10 instructs the command supply device 101 that the head part of the loop block 122 should be accumulated into the loop command buffer 113.

Further, as for LSI#2, when the buff value is 1, the central processing unit 10 instructs the command supply device 101 that the head part of the loop block 124 should be accumulated into the loop command buffer 114.

Next, the operation of the central processing unit 10 is described below.

When a command sequence (see FIG. 3) given as an example is to be executed, the central processing unit 10 performs processing in correspondence to the following cases (1) to (6).

(1) When executing the commands of a normal block, the central processing unit 10 instructs the memory interface 111 that the commands should be accumulated into the normal command buffer 112. Further, the central processing unit 10 instructs the selection circuit 116 to select the normal command buffer 112 as the command supply source.

(2) When executing a loop store command, the central processing unit 10 instructs the memory interface 111 that at the time when accumulation to the normal command buffer 112 is not performed, a predetermined amount of commands in the head part of a loop block identified by the loop store command should be accumulated into a loop command buffer specified by the loop store command.

(3) When executing commands supplied from the loop command buffer by executing a branch command, except for a case that the commands are supplied repeatedly, the central processing unit 10 instructs the memory interface 111 that commands that follow the command sequence accumulated in the loop command buffer should be accumulated into the linking command buffer 115.

(4) In the case where all commands have been supplied from the loop command buffer, the central processing unit 10 instructs the selection circuit 116 to select the linking command buffer 115 as the supply source for subsequent commands.

(5) When executing the commands supplied from the linking command buffer 115, except for a case that the commands are supplied repeatedly, the central processing unit 10 instructs the memory interface 111 that the commands that follow the command sequence accumulated in the linking command buffer 115 should be accumulated into the normal command buffer 112.

(6) When executing a branch command and branching to an address specified by the branch command, the central processing unit 10 instructs the selection circuit 116 to select a loop command buffer that accumulates the command identified by the address. On the other hand, when all commands are supplied from the linking command buffer 115 without being branched, the central processing unit 10 instructs the selection circuit 116 to select the normal command buffer 112 as the supply source for subsequent commands.

The operation of the command supply device 101 is described below.

In the command supply device 101, in response to an instruction from the central processing unit 10, each component operates as follows.

The memory interface 111 reads a command from the main memory 1, and accumulates the read-out command into any one of the normal command buffer 112, the loop command buffer 113, the loop command buffer 114, and the linking command buffer 115.

The selection circuit 116 selects, as the command supply source, any one of the normal command buffer 112, the loop command buffer 113, the loop command buffer 114, and the linking command buffer 115.

Then, the buffer selected as the command supply source supplies the commands accumulated in own buffer, to the central processing unit 10 via the selection circuit 116.

Here, the operations of the central processing unit 10 and the command supply device 101 are described below with reference to the command sequence (see FIG. 3) given as an example.

As shown in FIGS. 4A to 7B, the command supply device 101 performs processing in correspondence to the following cases (1) to (12).

(1) When executing commands of a normal block 121, the central processing unit 10 instructs the memory interface 111 that the command sequence (I#1 to I#7, LSI#1) in the normal block 121 should be accumulated into the normal command buffer 112. Then, the central processing unit 10 instructs the selection circuit 116 to select the normal command buffer 112 as the command supply source.

In response to this, the memory interface 111 accesses the main memory 1 so as to read out the command sequence (I#1 to I#7, LSI#1) from the main memory 1, and accumulates the read-out command sequence into the normal command buffer 112. Further, the selection circuit 116 selects the normal command buffer 112 as the command supply source. The normal command buffer 112 then supplies the command sequence (I#1 to I#7, LSI#1) to the central processing unit 10 via the selection circuit 116 (see FIG. 4A).

(2) When executing the commands of the loop block 122, except for a case that the commands are supplied repeatedly on the basis of a branch command, the central processing unit 10 instructs the memory interface 111 that the command sequence (I#8 to I#14) should be accumulated into the normal command buffer 112. Then, the central processing unit 10 instructs the selection circuit 116 to select the normal command buffer 112 as the command supply source. Further, when executing the loop store command (LSI#1), since the buff value of the loop store command (LSI#1) is 0, the central processing unit 10 instructs the memory interface 111 that the command sequence (I#8 to I#11) in the head part of the loop block 122 identified by the loop store command (LSI#1) should be accumulated into the loop command buffer 113.

In response to this, the memory interface 111 accesses the main memory 1 so as to read out the command sequence (I#8 to I#14) from the main memory 1, and accumulates the read-out command into the normal command buffer 112. Further, the selection circuit 116 selects the normal command buffer 112 as the command supply source. The normal command buffer 112 then supplies the command sequence (I#8 to BI#1) to the central processing unit 10 via the selection circuit 116. At the same time, in the background, the command sequence (I#8 to I#11) in the head part of the loop block 122 identified by the loop store command (LSI#1) is read out, and the read-out command sequence (I#8 to I#11) is accumulated into the loop command buffer 113 (see FIGS. 4B and 4C).

(3) When executing the branch command (BI#1) and branching to the start address of the loop block 122, the central processing unit 10 instructs the memory interface 111 that commands (I#12 to I#14) that follow the command sequence (I#8 to I#11) accumulated in the loop command buffer 113 should be accumulated into the linking command buffer 115. Then, the central processing unit 10 instructs the selection circuit 116 to select the loop command buffer 113 as the command supply source.

In response to this, the memory interface 111 accesses the main memory 1 so as to read out the command sequence (I#12 to I#14) from the main memory 1, and accumulates the read-out command sequence into the linking command buffer 115. Further, the selection circuit 116 selects the loop command buffer 113 as the command supply source. The loop command buffer 113 then supplies the command sequence (I#8 to I#11) to the central processing unit 10 via the selection circuit 116 (see FIG. 4D).

(4) When all commands are supplied from the loop command buffer 113, the central processing unit 10 instructs the selection circuit 116 to select the linking command buffer 115 as the supply source for subsequent commands.

In response to this, the selection circuit 116 selects the linking command buffer 115 as the command supply source. The linking command buffer 115 supplies the command sequence (I#12 to I#14) to the central processing unit 10 via the selection circuit 116 (see FIG. 5A).

(5) In the case where accumulation of the commands into the linking command buffer 115 has been completed, the central processing unit 10 instructs the memory interface 111 that commands (I#15 to I#17) which follow the command sequence (I#12 to I#14) accumulated in the linking command buffer 115 should be accumulated into the normal command buffer 112.

Figure 5A:
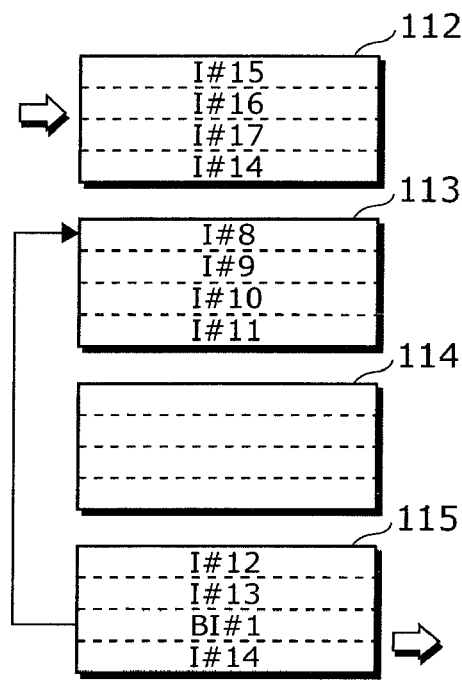
FIG. 5A is a fifth diagram showing an exemplary operation of the command supply device according to the first embodiment.
Figure 5B:
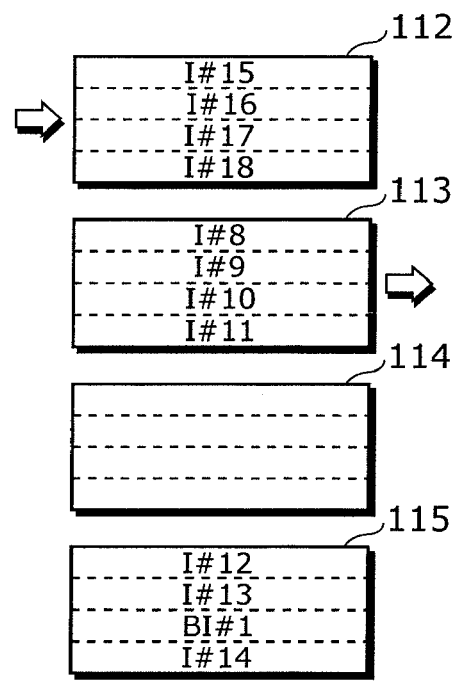
FIG. 5B is a sixth diagram showing an exemplary operation of the command supply device according to the first embodiment.
Figure 5C:
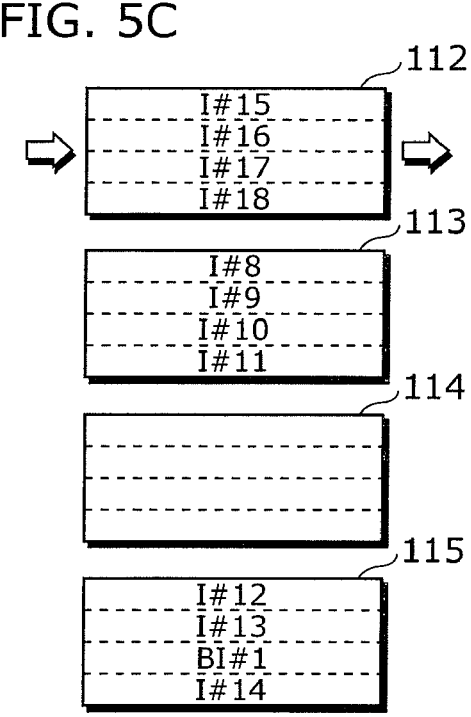
FIG. 5C is a seventh diagram showing an exemplary operation of the command supply device according to the first embodiment.
Figure 5D:
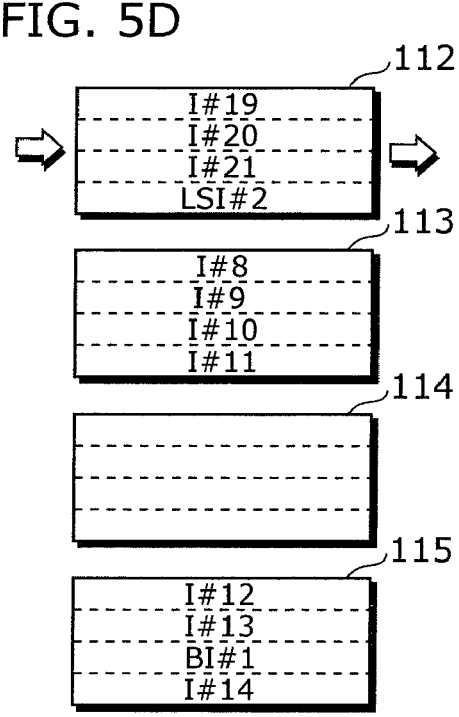
FIG. 5D is an eighth diagram showing an exemplary operation of the command supply device according to the first embodiment.
Figure 6A:
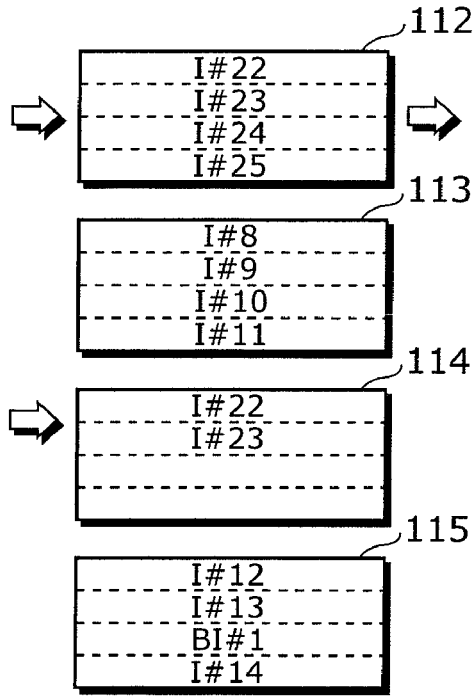
FIG. 6A is a ninth diagram showing an exemplary operation of the command supply device according to the first embodiment.
Figure 6B:
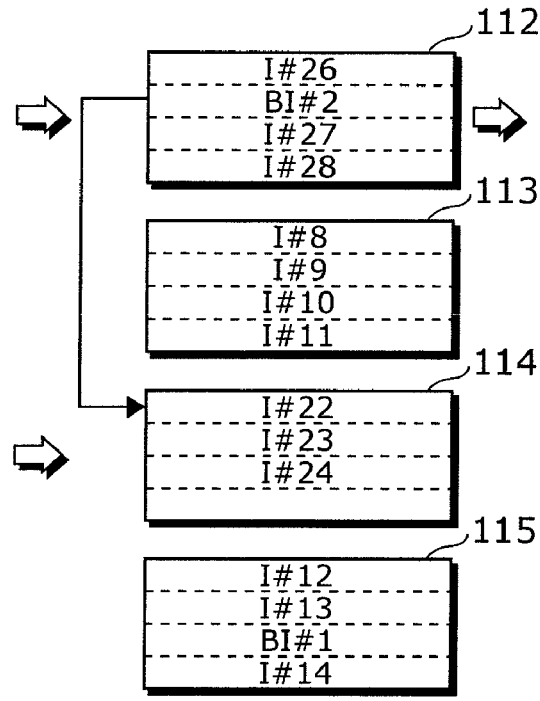
FIG. 6B is a tenth diagram showing an exemplary operation of the command supply device according to the first embodiment.
Figure 6C:
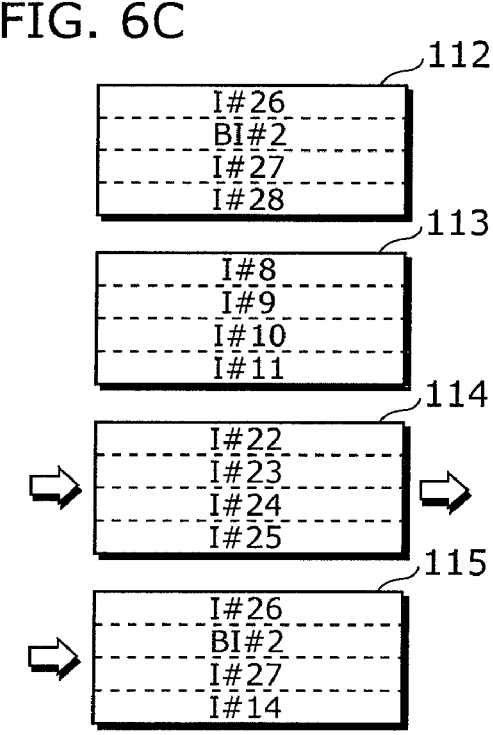
FIG. 6C is an eleventh diagram showing an exemplary operation of the command supply device according to the first embodiment.
Figure 6D:
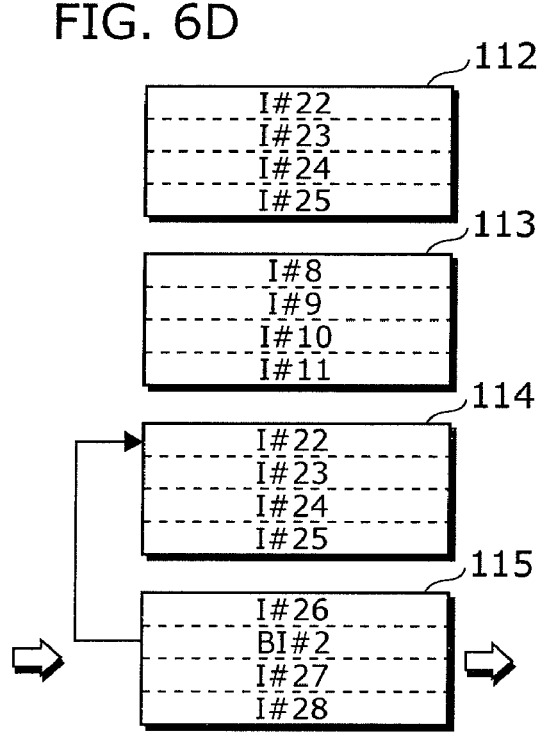
FIG. 6D is a twelfth diagram showing an exemplary operation of the command supply device according to the first embodiment.

In response to this, the memory interface 111 accesses the main memory 1 so as to read out the command sequence (I#15 to I#18) from the main memory 1, and accumulates the read-out command sequence into the normal command buffer 112 (see FIG. 5B).

(6) Instead of executing the branch command (BI#1) and branching to the start address of the loop block 122, in the case where all commands (I#12 to I#14) have been supplied from the linking command buffer 115, the central processing unit 10 instructs the selection circuit 116 to select the normal command buffer 112 as the supply source for subsequent commands.

In response to this, the selection circuit 116 selects the normal command buffer 112 as the command supply source. The normal command buffer 112 then supplies the command sequence (I#15 to I#18) to the central processing unit 10 via the selection circuit 116 (see FIG. 5C).

(7) When executing commands of the normal block 123, the central processing unit 10 instructs the memory interface 111 that the command sequence (I#19 to I#21, LSI#2) in the normal block 123 should be accumulated into the normal command buffer 112. Then, the central processing unit 10 instructs the selection circuit 116 to select the normal command buffer 112 as the command supply source.

In response to this, the memory interface 111 accesses the main memory 1 so as to read out the command sequence (I#19 to I#21, LSI#2) from the main memory 1, and accumulates the read-out command sequence into the normal command buffer 112. Further, the selection circuit 116 selects the normal command buffer 112 as the command supply source. The normal command buffer 112 then supplies the command sequence (I#19 to I#21, LSI#2) to the central processing unit 10 via the selection circuit 116 (see FIG. 5D).

(8) When executing the commands of the loop block 124, except for a case that the commands are supplied repeatedly on the basis of a branch command, the central processing unit 10 instructs the memory interface 111 that the command sequence (I#22 to I#28) should be accumulated into the normal command buffer 112. Then, the central processing unit 10 instructs the selection circuit 116 to select the normal command buffer 112 as the command supply source. Further, when executing the loop store command (LSI#2), since the buff value of the loop store command (LSI#2) is 1, the central processing unit 10 instructs the memory interface 111 that the command sequence (I#22 to I#25) in the head part of the loop block 124 identified by the loop store command (LSI#2) should be accumulated into the loop command buffer 114.

In response to this, the memory interface 111 accesses the main memory 1 so as to read out the command sequence (I#22 to I#25) from the main memory 1, and accumulates the read-out command sequence into the normal command buffer 112. Further, the selection circuit 116 selects the normal command buffer 112 as the command supply source. The normal command buffer 112 then supplies the command sequence (I#22 to I#25) to the central processing unit 10 via the selection circuit 116. At the same time, in the background, the command sequence (I#22 to I#25) in the head part of the loop block 124 identified by the loop store command (LSI#2) is read out. Then, the read-out command sequence (I#22 to I#25) is accumulated into the loop command buffer 114 (see FIGS. 6A and 6B).

(9) When executing the branch command (BI#2) and branching to the start address of the loop block 124, the central processing unit 10 instructs the memory interface 111 that commands (I#26 to I#28) which follow the command sequence (I#22 to I#25) accumulated in the loop command buffer 114 should be accumulated into the linking command buffer 115. Then, the central processing unit 10 instructs the selection circuit 116 to select the loop command buffer 113 as the command supply source.

In response to this, the memory interface 111 accesses the main memory 1 so as to read out the command sequence (I#26 to I#28) from the main memory 1, and accumulates the read-out command sequence into the linking command buffer 115. Further, the selection circuit 116 selects the loop command buffer 113 as the command supply source. The loop command buffer 114 then supplies the command sequence (I#22 to I#25) to the central processing unit 10 via the selection circuit 116 (see FIG. 6C).

(10) In the case where all commands have been supplied from the loop command buffer 114, the central processing unit 10 instructs the selection circuit 116 that the linking command buffer 115 should be selected as the supply source for subsequent commands.

In response to this, the selection circuit 116 selects the linking command buffer 115 as the command supply source. The linking command buffer 115 supplies the command sequence (I#26 to I#28) to the central processing unit 10 via the selection circuit 116 (see FIG. 6D).

(11) In the case where accumulation of the commands into the linking command buffer 115 has been completed, the central processing unit 10 instructs the memory interface 111 that commands (I#29 to I#32) which follow the command sequence (I#26 to I#28) accumulated in the linking command buffer 115 should be accumulated into the normal command buffer 112.

Figure 7A:
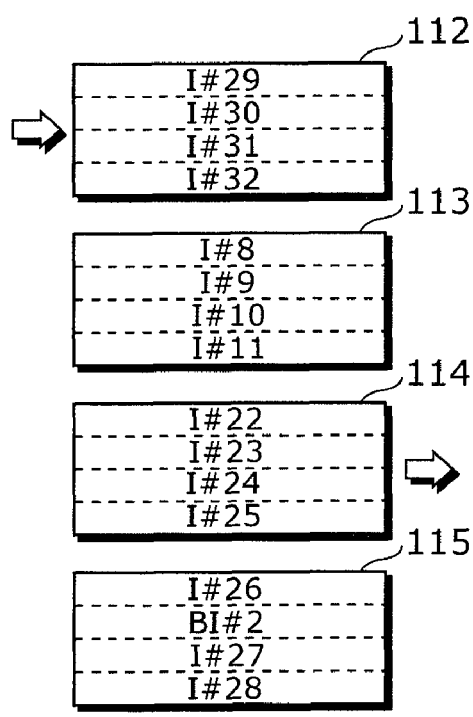
FIG. 7A is a thirteenth diagram showing an exemplary operation of the command supply device according to the first embodiment.
Figure 7B:
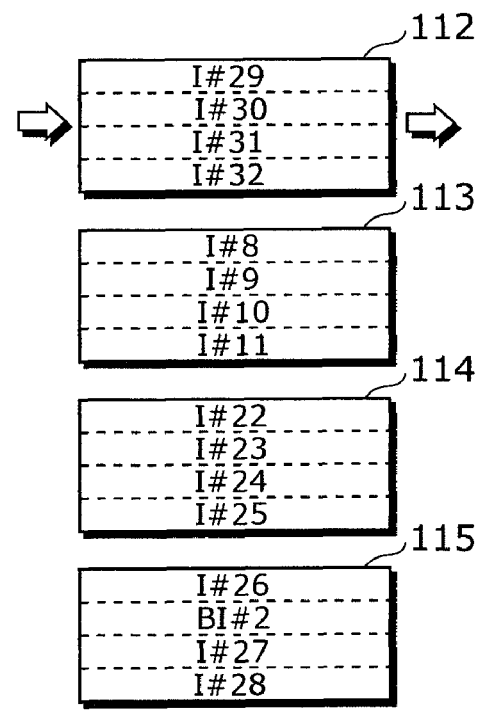
FIG. 7B is a fourteenth diagram showing an exemplary operation of the command supply device according to the first embodiment.

In response to this, the memory interface 111 accesses the main memory 1 so as to read out the command sequence (I#29 to I#32) from the main memory 1, and accumulates the read-out command sequence into the normal command buffer 112 (see FIG. 7A).

(12) Instead of executing the branch command (BI#2) and branching to the start address of the loop block 124, in the case where all commands (I#26 to I#28) have been supplied from the linking command buffer 115, the central processing unit 10 instructs the selection circuit 116 to select the normal command buffer 112 as the supply source for subsequent commands.

In response to this, the selection circuit 116 selects the normal command buffer 112 as the command supply source. Then, the normal command buffer 112 supplies the command sequence (I#29 to I#32) to the central processing unit 10 via the selection circuit 116 (see FIG. 7B).

As described above, according to the command supply device in the first embodiment of the present invention, in comparison with a case that a command sequence of a loop block is accumulated in a single buffer, the sequence can be divided and accumulated into two or more buffers. Thus, unless these buffers are all updated, the command sequence accumulated in the buffer without being updated can be re-used. Further, even when the entire loop is not always held in the buffer, the situation becomes equivalent to a state that the entirety is held in the buffer at the time of looping, by storing latter half of the loop into a buffer in the background during the loop execution. This permits efficient command supply.

For example, each half of commands for eight words is accumulated in each of two buffers. Here, even when one buffer among the two is updated, if the other buffer is not updated, the commands for four words accumulated in the other buffer without being updated can be re-used. That is, it is sufficient to solely read out the updated commands for four words from the main memory again without reading out the commands for eight words from the main memory again. This reduces the time of accessing the main memory. Then, when the commands are repeatedly supplied to a loop block up to eight words which is the total number of words in the loop command buffer and the linking command buffer, the commands of the loop block can be supplied without an access to the main memory.

Similarly, also in the case where another loop command buffer is used in place of the linking command buffer, when the commands are to be supplied repeatedly to a loop block up to eight words, the commands of the loop block can be supplied without accessing to the main memory.

Here, as for two loop blocks of eight words, in order to supply commands during the loop without accessing to the main memory, two loop command buffers of eight words are required in the conventional configuration. Thus, command buffers of 16 words in total are required. In contrast, in the first embodiment of the present invention, command buffers of 12 words in total consisting of the loop command buffer 113, the loop command buffer 114, and the linking command buffer 115 realize an equivalent function. That is, the commands can efficiently be supplied to the loop block in a smaller amount of hardware.

Second Embodiment

The second embodiment of the present invention is described below with reference to the drawings. Here, description is omitted for the same configuration as in the first embodiment.

A command supply device according to the second embodiment of the present invention is different from the command supply device 101 (see FIG. 1) in that the linking command buffer 115 is not provided but that a normal command buffer is provided which serves as both of the normal command buffer 112 and the linking command buffer 115.

Specifically, the normal command buffer of the second embodiment functions as the normal command buffer 112 when commands of a normal block are supplied, and functions as the linking command buffer 115 when commands of a loop block are supplied.

Based on the above, the command supply device according to the second embodiment of the present invention is described below.

First, the configuration of the command supply device according to the second embodiment of the present invention is described.

Figure 8:
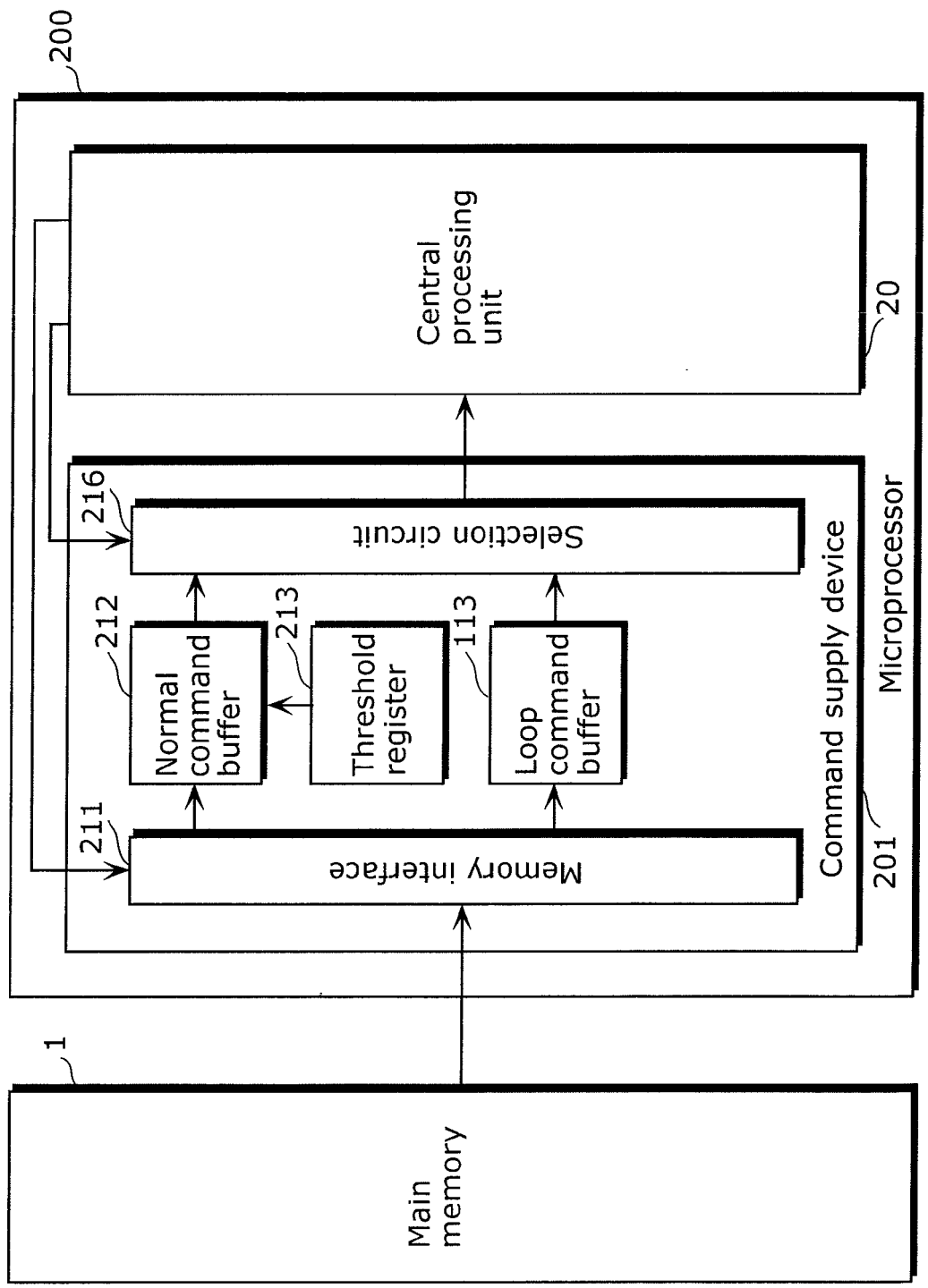
FIG. 8 is a diagram showing a configuration of a command supply device according to a second embodiment.

As shown in FIG. 8, the command supply device 201 is different from the command supply device 101 (see FIG. 1) in the following points (1) to (5).

(1) A memory interface 211 is included in place of the memory interface 111.

In response to an instruction from the central processing unit 20, the memory interface 211 reads out a command from the main memory 1, and accumulates the read-out command into any one of the normal command buffer 212 and the loop command buffer 113.

(2) A normal command buffer 212 is included in place of the normal command buffer 112.

When commands of a normal block are supplied, similar to the normal command buffer 112, the normal command buffer 212 accumulates the commands for four words read out from the normal block. Further, when commands of a loop block are supplied, similarly to the linking command buffer 115, the normal command buffer 212 accumulates the commands for four words that follow the command sequence accumulated in the loop command buffer 113.

(3) A selection circuit 216 is included in place of the selection circuit 116.

In response to an instruction from the central processing unit 10, the selection circuit 216 selects any one of the normal command buffer 212 and the loop command buffer 113 as the command supply source.

(4) A threshold register 213 is newly included.

The threshold register 213 holds a threshold to be referred to for judging whether the amount of an available area in the normal command buffer 212 has reached a predetermined capacity during the time when the normal command buffer 212 supplies the commands the loop block.

(5) The loop command buffer 114 and the linking command buffer 115 are not included.

The command supply device 201 has merely a single loop command buffer, and hence ignores the buff value of the loop store command, that is, the information for selecting a buffer.

The processing of fetching a command from the main memory in the command supply device according to the second embodiment is described below.

Figure 9:
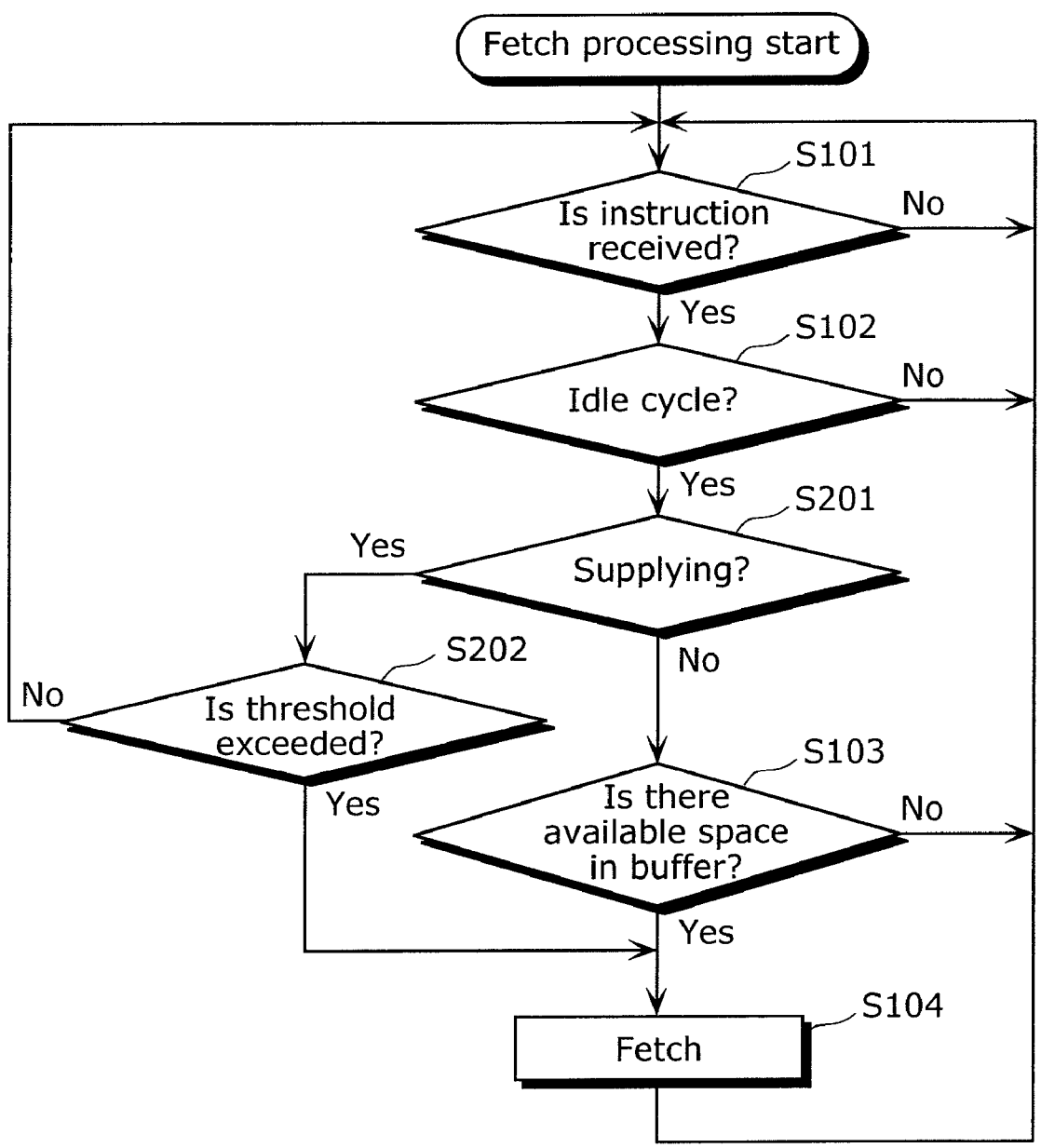
FIG. 9 is a diagram showing a process of fetching a command from a main memory in a command supply device according to the second embodiment.

As shown in FIG. 9, during the time when a command which follows the command sequence accumulated in the loop command buffer 113 is being supplied (step S201: Yes), until an available area in the buffer generated in association with command supply exceeds a predetermined threshold (two words in this example), the normal command buffer 212 does not accumulate a new command (step S202).

The operation of the central processing unit 20 is described below.

When the command sequence (see FIG. 3) given as an example in the first embodiment is executed, the central processing unit 20 performs processing in correspondence to the following cases (1) to (5).

(1) When executing commands of a normal block, the central processing unit 20 instructs the memory interface 211 that the commands should be accumulated into the normal command buffer 212. Further, the central processing unit 20 instructs the selection circuit 216 to select the normal command buffer 212 as the command supply source.

(2) In the case where a loop store command has been executed, the central processing unit 20 instructs the memory interface 211 that at the time when accumulation to the normal command buffer 212 is not performed, a predetermined amount of commands in the head part of a loop block identified by the loop store command should be accumulated into the loop command buffer 113.

(3) When executing commands supplied from the loop command buffer 113 by executing a branch command, the central processing unit 20 instructs the memory interface 211 that commands that follow the command sequence accumulated in the loop command buffer 113 should be accumulated into the normal command buffer 212.

(4) In the case where all commands have been supplied from the loop command buffer, the central processing unit 20 instructs the selection circuit 216 to select the normal command buffer 212 as the supply source for subsequent commands.

(5) When executing a branch command and branching to an address specified by the branch command, the central processing unit 20 instructs the selection circuit 216 to select the loop command buffer 113. On the other hand, in the case where branching is not performed while remaining commands have been supplied from the normal command buffer 112, the central processing unit 20 instructs the memory interface 211 that commands which follows the command sequence accumulated in the normal command buffer 212 should be accumulated into the normal command buffer 212.

The operation of the command supply device 201 is described below.

Through the memory interface 211 having received an instruction from the central processing unit 20, the command supply device 201 previously reads out a command from the main memory 1, and accumulates the read-out command into any one of the normal command buffer 212 and the loop command buffer 113. Further, the selection circuit 216 selects any one of the normal command buffer 212 and the loop command buffer 113 as the command supply source. The buffer selected as the command supply source then supplies the commands accumulated in the buffer, to the central processing unit 20 via the selection circuit 216.

Here, during the time when the commands of a loop block are being supplied, if an available space generated as a result of supplying the commands exceeds the threshold held in the threshold register 213, the normal command buffer 212 restart the processing of reading and accumulating the subsequent commands from the main memory 1.

Then, when the commands of the loop block are supplied, that is, when the subsequent commands are supplied to the loop command buffer 113, even when an available space is generated in its own buffer as a result of supplying the commands, the normal command buffer 212 does not read out and accumulate a new command from the main memory 1, until the available space exceeds the threshold (for example, two words). By virtue of this, subsequent commands are held continuously in the loop command buffer 113.

Here, the operations of the central processing unit 20 and the command supply device 201 are described below with reference to the command sequence (see FIG. 3) given as an example.

As shown in FIGS. 10A to 12B, the command supply device 201 performs processing in correspondence to the following cases (1) to (12).

(1) When executing commands of the normal block 121, the central processing unit 20 instructs the memory interface 211 that the command sequence (I#1 to I#7, LSI#1) of the normal block 121 should be accumulated into the normal command buffer 212. Then, the central processing unit 20 instructs the selection circuit 216 to select the normal command buffer 212 as the command supply source.

In response to this, the memory interface 211 accesses the main memory 1 so as to read out the command sequence (I#1 to I#7, LSI#1) from the main memory 1, and accumulates the read-out command sequence into the normal command buffer 212. Further, the selection circuit 216 selects the normal command buffer 212 as the command supply source. The normal command buffer 212 then supplies the command sequence (I#1 to I#7, LSI#1) to the central processing unit 20 via the selection circuit 216 (see FIG. 10A).

(2) When executing the commands of the loop block 122, except for the case where the commands are supplied repeatedly on the basis of a branch command, the central processing unit 20 instructs the memory interface 211 that the command sequence (I#8 to I#14) should be accumulated into the normal command buffer 212. Then, the central processing unit 20 instructs the selection circuit 216 to select the normal command buffer 212 as the command supply source. Further, in the case where the loop store command (LSI#1) has been executed, the central processing unit 20 instructs the memory interface 211 such that the command sequence (I#8 to I#11) in the head part of the loop block 122 identified by the loop store command (LSI#1) should be accumulated into the loop command buffer 113.

In response to this, the memory interface 211 accesses the main memory 1 so as to read out the command sequence (I#8 to I#14) from the main memory 1, and accumulates the read-out command sequence into the normal command buffer 212. Further, the selection circuit 216 selects the normal command buffer 212 as the command supply source. Then, the normal command buffer 212 supplies the command sequence (I#8 to I#11) to the central processing unit 20 via the selection circuit 216. At the same time, in the background, the command sequence (I#8 to I#11) in the head part of the loop block 122 identified by the loop store command (LSI#1) is read out.

Figure 10A:
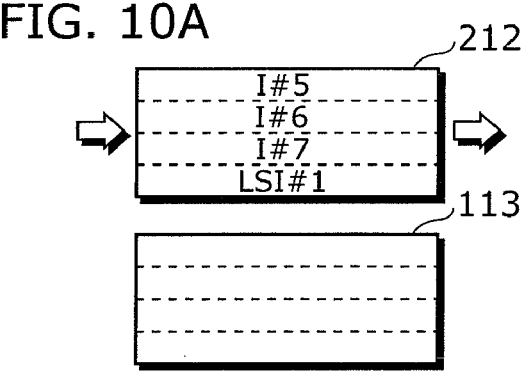
FIG. 10A is a first diagram showing an exemplary operation of the command supply device according to the second embodiment.
Figure 10B:
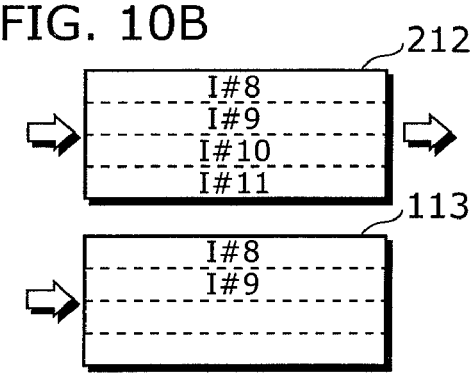
FIG. 10B is a second diagram showing an exemplary operation of the command supply device according to the second embodiment.
Figure 10C:
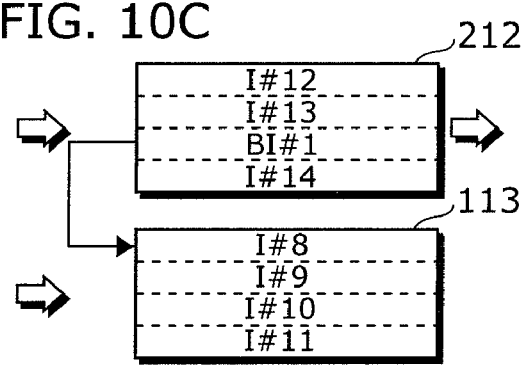
FIG. 10C is a third diagram showing an exemplary operation of the command supply device according to the second embodiment.
Figure 10D:
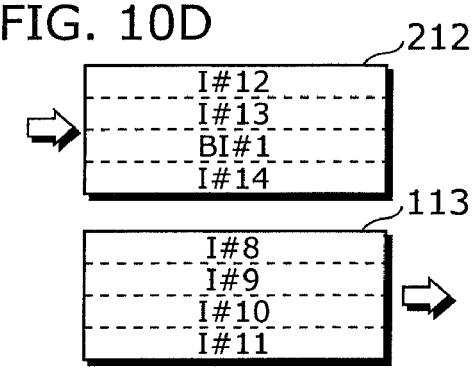
FIG. 10D is a fourth diagram showing an exemplary operation of the command supply device according to the second embodiment.
Figure 10E:
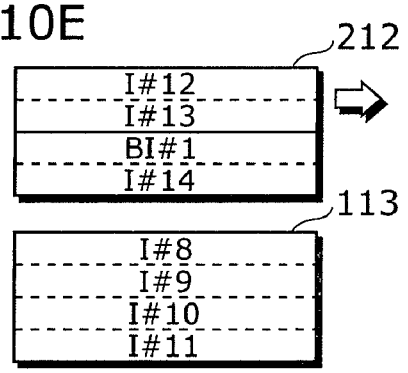
FIG. 10E is a fifth diagram showing an exemplary operation of the command supply device according to the second embodiment.

Then, the read-out command sequence (I#8 to I#11) is accumulated into the loop command buffer 113 (see FIGS. 10B and 10C).

(3) When executing the branch command (BI#1) and branching to the start address of the loop block 122, the central processing unit 20 instructs the memory interface 211 that commands (I#12 to I#14) which follow the command sequence (I#8 to I#11) accumulated in the loop command buffer 113 should be accumulated into the normal command buffer 212. Then, the central processing unit 20 instructs the selection circuit 216 to select the loop command buffer 113 as the command supply source.

In response to this, the memory interface 211 accesses the main memory 1 so as to read out the command sequence (I#12 to I#14) from the main memory 1, and accumulates the read-out command sequence into the normal command buffer 212. Further, the selection circuit 216 selects the loop command buffer 113 as the command supply source. The loop command buffer 113 then supplies the command sequence (I#8 to I#11) to the central processing unit 20 via the selection circuit 216 (see FIG. 10D).

(4) In the case where all commands have been supplied from the loop command buffer 113, the central processing unit 20 instructs the selection circuit 216 to select the normal command buffer 212 as the supply source for subsequent commands.

In response to this, the selection circuit 216 selects the normal command buffer 212 as the command supply source. The normal command buffer 212 supplies the command sequence (I#12, I#13) to the central processing unit 20 via the selection circuit 216 (see FIG. 10E).

Further, the normal command buffer 212 supplies the commands to the central processing unit 20 via the selection circuit 216. At this time, the available space in the normal command buffer 212 generated when the commands were supplied to the central processing unit 20 exceeds a threshold. Therefore, the memory interface 211 is instructed such that commands (I#15, I#16) which follow the command sequence (I#12 to I#14) accumulated in the normal command buffer 212 should be accumulated into the normal command buffer 212.

Figure 10F:
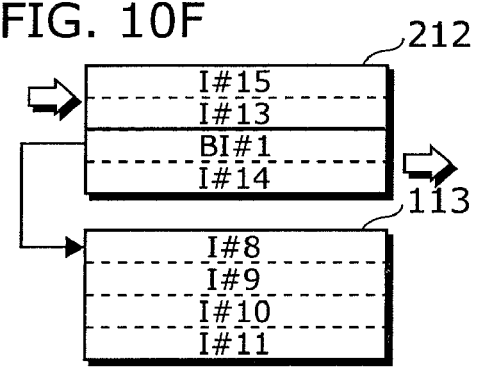
FIG. 10F is a sixth diagram showing an exemplary operation of the command supply device according to the second embodiment.
Figure 10G:
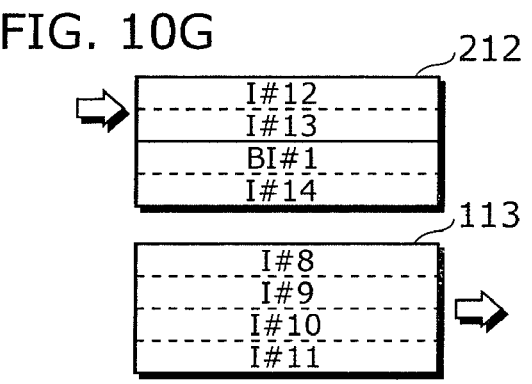
FIG. 10G is a seventh diagram showing an exemplary operation of the command supply device according to the second embodiment.
Figure 10H:
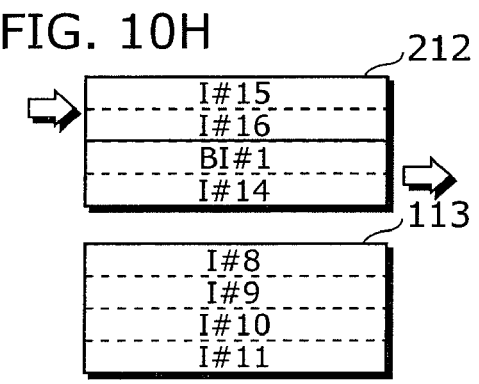
FIG. 10H is an eighth diagram showing an exemplary operation of the command supply device according to the second embodiment.
Figure 11A:
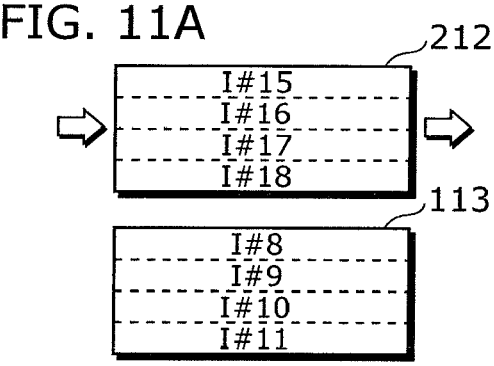
FIG. 11A is a ninth diagram showing an exemplary operation of the command supply device according to the second embodiment.
Figure 11B:
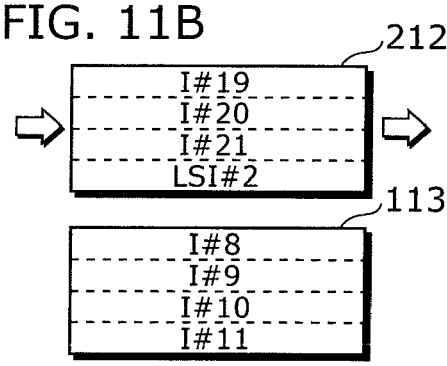
FIG. 11B is a tenth diagram showing an exemplary operation of the command supply device according to the second embodiment.
Figure 11C:
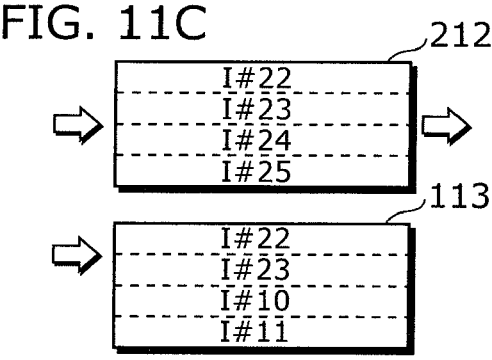
FIG. 11C is an eleventh diagram showing an exemplary operation of the command supply device according to the second embodiment.
Figure 11D:
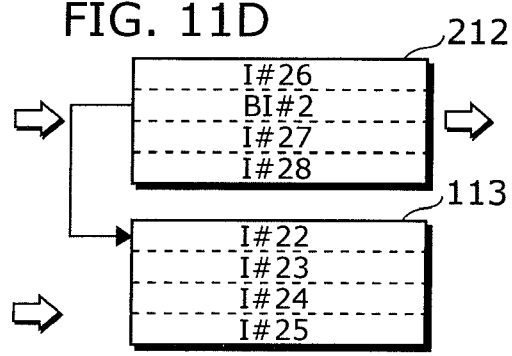
FIG. 11D is a twelfth diagram showing an exemplary operation of the command supply device according to the second embodiment.
Figure 11E:
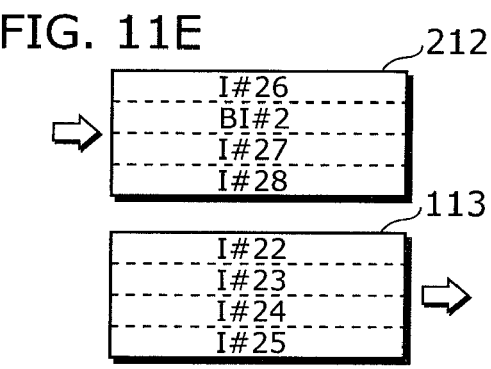
FIG. 11E is a thirteenth diagram showing an exemplary operation of the command supply device according to the second embodiment.
Figure 11F:
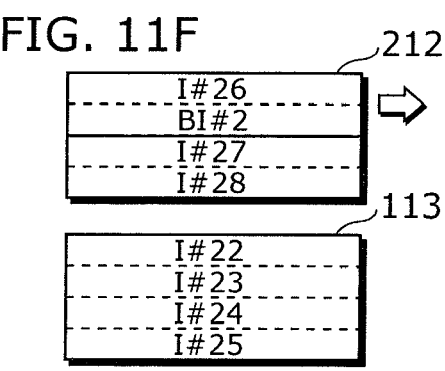
FIG. 11F is a fourteenth diagram showing an exemplary operation of the command supply device according to the second embodiment.
Figure 11G:
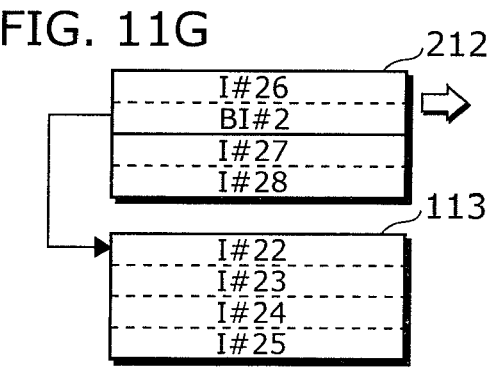
FIG. 11G is a fifteenth diagram showing an exemplary operation of the command supply device according to the second embodiment.
Figure 11H:
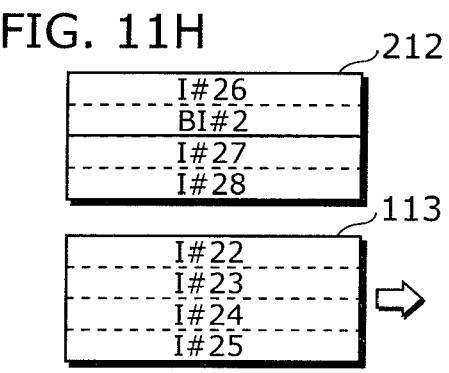
FIG. 11H is a sixteenth diagram showing an exemplary operation of the command supply device according to the second embodiment.
Figure 12A:
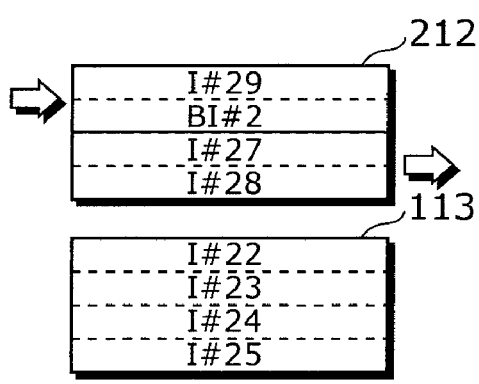
FIG. 12A is a seventeenth diagram showing an exemplary operation of the command supply device according to the second embodiment.
Figure 12B:
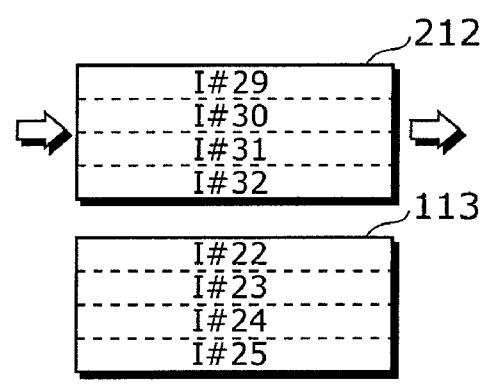
FIG. 12B is an eighteenth diagram showing an exemplary operation of the command supply device according to the second embodiment.

In response to this, the memory interface 211 accesses the main memory 1 so as to read out the command sequence (I#15, I#16) from the main memory 1, and accumulates the read-out command sequence into the normal command buffer 212 (see FIG. 10F).

(5) When executing the branch command (BI#1) and branching to the start address of the loop block 122, the central processing unit 20 instructs the selection circuit 216 to select the loop command buffer 113 as the command supply source. Then, the central processing unit 20 instructs the memory interface 211 that commands (I#12 and I#13) which follow the command sequence (I#8 to I#11) accumulated in the loop command buffer 113 should be accumulated into the normal command buffer 212.

In response to this, the selection circuit 216 selects the loop command buffer 113 as the command supply source. Further, the loop command buffer 113 supplies the command sequence (I#8 to I#11) to the central processing unit 20 via the selection circuit 216. Then, the memory interface 211 accesses the main memory 1 so as to read out the command sequence (I#12 and I#13) from the main memory 1, and accumulates the read-out command sequence into the normal command buffer 212 (see FIG. 10G).

(6) Instead of executing the branch command (BI#1) and branching to the start address of the loop block 122, in the case where all commands (I#12 to I#14) have been supplied from the normal command buffer 212, the central processing unit 20 instructs the memory interface 211 that commands (I#15 to I#18) which follow the command sequence (I#12 to I#14) accumulated in the normal command buffer 212 should be accumulated into the normal command buffer 212.

In response to this, the memory interface 211 accesses the main memory 1 so as to read out the command sequence (I#15 to I#18) from the main memory 1, and accumulates the command sequence into the normal command buffer 212. Then, the normal command buffer 212 supplies the command sequence (I#15 to I#18) to the central processing unit 20 via the selection circuit 216 (see FIGS. 10H and 11A).

(7) When executing commands of the normal block 121, the central processing unit 20 instructs the memory interface 211 that the command sequence (I#19 to I#21, LSI#2) of the normal block 121 should be accumulated into the normal command buffer 212. Then, the central processing unit 20 instructs the selection circuit 216 to select the normal command buffer 212 should be selected as the command supply source.

In response to this, the memory interface 211 accesses the main memory 1 so as to read out the command sequence (I#19 to I#21, LSI#2) from the main memory 1, and accumulates the read-out sequence into the normal command buffer 212. Further, the selection circuit 216 selects the normal command buffer 212 as the command supply source. The normal command buffer 212 then supplies the command sequence (I#19 to I#21, LSI#2) to the central processing unit 20 via the selection circuit 216 (see FIG. 11B).

(8) When executing the commands of the loop block 124, except for the case where the commands are supplied repeatedly on the basis of a branch command, the central processing unit 20 instructs the memory interface 211 that the command sequence (I#22 to I#25) should be accumulated into the normal command buffer 212. Then, the central processing unit instructs the selection circuit 216 to select the normal command buffer 212 as the command supply source. Further, in the case where the loop store command (LSI#2) has been executed, the central processing unit instructs the memory interface 211 that the command sequence (I#22 to I#25) in the head part of the loop block 124 identified by the loop store command (LSI#2) should be accumulated into the loop command buffer 113.

In response to this, the memory interface 211 accesses the main memory 1 so as to read out the command sequence (I#22 to I#25) from the main memory 1, and accumulates the read-out command sequence into the normal command buffer 212. Further, the selection circuit 216 selects the normal command buffer 212 as the command supply source. The normal command buffer 212 then supplies the command sequence (I#22 to BI#2) to the central processing unit 20 via the selection circuit 216. At the same time, in the background, the command sequence (I#22 to I#25) in the head part of the loop block 124 identified by the loop store command (LSI#2) is read out. Then, the read-out command sequence (I#22 to I#25) is accumulated into the loop command buffer 113 (see FIGS. 11C and 11D).

(9) When executing the branch command (BI#2) and branching to the start address of the loop block 124, the central processing unit 20 instructs the memory interface 211 that commands (I#26 to I#28) that follow the command sequence (I#22 to I#25) accumulated in the loop command buffer 113 should be accumulated into the normal command buffer 212. Then, the central processing unit 20 instructs the selection circuit 216 to select the loop command buffer 113 as the command supply source.

In response to this, the memory interface 211 accesses the main memory 1 so as to read out the command sequence (I#26 to I#28) from the main memory 1, and accumulates the read-out command sequence into the normal command buffer 212. Further, the selection circuit 216 selects the loop command buffer 113 as the command supply source. Then, the loop command buffer 113 supplies the command sequence (I#22 to I#25) to the central processing unit 20 via the selection circuit 216 (see FIG. 11E).

(10) In the case where all commands have been supplied from the loop command buffer 113, the central processing unit 20 instructs the selection circuit 216 to select the normal command buffer 212 as the supply source for subsequent commands.

In response to this, the selection circuit 216 selects the normal command buffer 212 as the command supply source. The normal command buffer 212 supplies the command sequence (I#26, BI#2) to the central processing unit 20 via the selection circuit 216 (see FIG. 11F).

Further, the normal command buffer 212 supplies the commands to the central processing unit 20 via the selection circuit 216. At this time, the available space in the normal command buffer 212 generated as a result of supplying the commands to the central processing unit 20 does not exceed the threshold. Thus, the central processing unit 20 does not instruct the memory interface 211 that commands (I#29 and I#30) which follow the command sequence (I#26 to I#28) accumulated in the normal command buffer 212 should be accumulated into the available space generated in the normal command buffer 212 (see FIG. 11G).

(11) When executing the branch command (BI#2) and branching to the start address of the loop block 124, the central processing unit 20 instructs the selection circuit 216 to select the loop command buffer 113 as the command supply source.

In response to this, the selection circuit 216 selects the loop command buffer 113 as the command supply source. Then, the loop command buffer 113 supplies the command sequence (I#22 to I#25) to the central processing unit 20 via the selection circuit 216 (see FIG. 11H).

(12) Instead of executing the branch command (BI#2) and branching to the start address of the loop block 122, when all commands (I#26 to I#28) are supplied from the normal command buffer 212, the central processing unit 20 instructs the memory interface 211 that commands (I#29 to I#32) which follow the command sequence (I#26 to I#28) accumulated in the normal command buffer 212 should be accumulated into the normal command buffer 212.

In response to this, the memory interface 211 accesses the main memory 1 so as to read out the command sequence (I#29 to I#32) from the main memory 1, and accumulates the read-out command sequence into the normal command buffer 212. Then, the normal command buffer 212 supplies the command sequence (I#29 to I#32) to the central processing unit 20 via the selection circuit 216 (see FIGS. 12A and 12B).

As described above, according to the command supply device 201, as for a loop block up to six words, commands can repeatedly be supplied without access to the main memory 1.

For example, in order that an equivalent result to be realized in the conventional configuration, a loop command buffer that accumulates commands for six words is necessary in addition to the normal command buffer that accumulates commands for four words. That is, buffers that accumulate commands for ten words in total are required.

However, according to the command supply device 201, the normal command buffer 212 that accumulates commands for four words is utilized effectively, so that commands for four words in the loop block for six words are accumulated into the loop command buffer 113 while the commands for the remaining two words are accumulated into the normal command buffer 212. That is, a loop command buffer that accumulates collectively the loop block for six words need not be provided, while the normal command buffer 212 that accumulates commands for four words and the loop command buffer 113 that accumulates commands for four words are solely necessary. That is, buffers that accumulate commands for eight words in total are required. Thus, in comparison with the conventional configuration, buffers for two words are reduced.

(Other Points)

Here, the threshold held in the threshold register 213 may be set up by a program. Further, it may be set up within the capacity of the normal command buffer 212. Accordingly, commands in accordance with the identification of a program can be supplied. Then, when the threshold is increased, the capacity to be assigned to the commands of a loop block increases so that the commands can be supplied efficiently. In contrast, for the command sequence following the loop block, the capacity to be assigned decreases, reducing the number of commands allowed to be accumulated in the normal command buffer 212 together with the loop block.

Here, the command supply device may be implemented by a full custom LSI (Large Scale Integration). Alternatively, the implementation may be in the form of a semi custom LSI such as an ASIC (Application Specific Integrated Circuit). Further, the implementation may be in the form of a programmable logic device such as an FPGA (Field Programmable Gate Array) or a CPLD (Complex Programmable Logic Device). Furthermore, the implementation may be in the form of a dynamic reconfigurable device the circuit configuration of which can be rewritten dynamically.

Further, design data for allowing such an LSI to implement one or two or more functions that constitute the command supply device may be in the form of a program (referred to as an HDL program, hereinafter) described in a hardware description language such as VHDL (Very high speed integrated circuit Hardware Description Language), Verilog-HDL, and SystemC. Further, the implementation may be in the form of a net list at a gate level obtained by logic synthesis of an HDL program. Further, the implementation may be in the form of macro cell information generated by adding arrangement information, process conditions, and the like to the net list at the gate level. Further, the implementation may be in the form of mask data in which size, timing, and the like are defined.

Further, in order that a hardware system such as a computer system and an installed system should be allowed to read out the design data, the data may be recorded on a computer-readable recording medium such as an optical recording medium (for example, a CD-ROM), a magnetic recording medium (for example, a hard disk), a magneto-optic recording medium (for example, an MO), and a semiconductor memory (for example, a RAM). Then, the design data read out by another hardware system via the recording medium may be downloaded: to a programmable logic device through a download cable.

Alternatively, in order that another hardware system should be allowed to acquire the design data via a transmission path such as a network, the data may be held in a hardware system on a transmission path. Then, the design data acquired from the hardware system by another hardware system through the transmission path may be downloaded to a programmable logic device through a download cable.

Alternatively, the design data logically synthesized, arranged, or wired may be recorded in a serial ROM in such a manner that the data is transmitted to an FPGA when the power is ON. Then, the design data recorded in the serial ROM may be downloaded directly to the FPGA at the time of power ON.

INDUSTRIAL APPLICABILITY

The present invention is applicable to a command supply device or the like that supplies to a central processing unit a command read out from a main memory, and in particular to a command supply device that supplies the commands of a loop composed of a larger number of commands without accessing to a main memory and increasing the capacity of a loop command buffer.

The invention claimed is:

1. A command supply device that supplies, to a central processing unit, a command read out from a main memory, said device comprising:
   a first buffer in which said command supply device accumulates a first partial command sequence that is a head part of a first command sequence repeatedly supplied to the central processing unit from among command sequences stored in the main memory, before supplying the first command sequence to the central processing unit again;
   a second buffer in which said command supply device accumulates a second partial command sequence that follows the first partial command sequence while supplying the first partial command sequence accumulated in said first buffer to the central processing unit, when repeatedly supplying the first command sequence to the central processing unit; and
   a selection unit operable to supply to the central processing unit a command from the second partial command sequence accumulated in said second buffer, when the entirety of the first partial command sequence has been supplied to the central processing unit,
   wherein a first command is stored in the main memory, the first command including a location of the first command sequence and information for identifying the first partial command sequence as a command sequence to be accumulated in said first buffer,
   said command supply device is further operable to receive an instruction based on the information included in the first command from the central processing unit which has executed the first command, and to accumulate the first partial command sequence into said first buffer according to the received instruction,
   a first branch command included in the first command sequence is stored in the main memory, the first branch command executing branching to a command included in the first command sequence, and
   said command supply device is operable to supply, to the central processing unit, the first partial command sequence accumulated in said first buffer when the first branch command has been executed by the central processing unit, and to accumulate, at the same time, the second partial command sequence into said second buffer when the first branch command has been executed by the central processing unit and when the second partial command sequence is not accumulated in said second buffer.

2. The command supply device according to claim 1, further comprising:
   a third buffer in which said command supply device accumulates a third partial command sequence that is a head part of a second command sequence repeatedly supplied to the central processing unit other than the first command sequence from among the command sequences stored in the main memory, before supplying the second command sequence to the central processing unit again,
   wherein said command supply device accumulates into said second buffer, a fourth partial command sequence that follows the third partial command sequence, while supplying the third partial command sequence accumulated in said third buffer to the central processing unit, when repeatedly supplying the second command sequence to the central processing unit, and
   said selection unit is operable to supply, to the central processing unit, a command from the fourth partial command sequence accumulated in said second buffer, when the entirety of the third partial command sequence has been supplied to the central processing unit,
   a second command is stored in the main memory, the second command including a location of the second command sequence and information for identifying the third partial command sequence as a command sequence to be accumulated in said third buffer, and
   said command supply device is further operable to receive an instruction based on the information included in the second command from the central processing unit which has executed the second command, and to accumulate the third partial command sequence into said third buffer according to the received instruction,
   a second branch command included in the second command sequence is stored in the main memory, the second branch command executing branching to a command included in the second command sequence, and
   said command supply device is operable to supply, to the central processing unit, the third partial command sequence accumulated in the third buffer when the second branch command has been executed by the central processing unit, and to accumulate, at the same time, the fourth partial command sequence into said second buffer when the second branch command has been executed by the central processing unit and when the fourth partial command sequence is not accumulated in said second buffer.

3. The command supply device according to claim 2, further comprising
   a fourth buffer in which said command supply device sequentially accumulates a command sequence stored in the main memory, when supplying the command sequence to the central processing unit,
   wherein said selection unit is operable to sequentially supply, to the central processing unit the command sequence accumulated in said fourth buffer except when the command sequence is repeatedly supplied to the central processing unit.

4. The command supply device according to claim 1,
   wherein said command supply device sequentially accumulates a command sequence into said second buffer except when repeatedly supplying the first command sequence to the central processing unit, when supplying the command sequence stored in the main memory to the central processing unit.

5. A command supply device that supplies, to a central processing unit, a command read out from a main memory, said device comprising:
   a first buffer in which said command supply device accumulates a first partial command sequence that is a head part of a first command sequence repeatedly supplied to the central processing unit from among command sequences stored in the main memory, before supplying the first command sequence to the central processing unit again;

a second buffer in which said command supply device accumulates a second partial command sequence that follows the first partial command sequence while supplying the first partial command sequence accumulated in said first buffer to the central processing unit, when repeatedly supplying the first command sequence to the central processing unit; and a selection unit operable to supply, to the central processing unit, a command from the second partial command sequence accumulated in said second buffer, when the entirety of the first partial command sequence has been supplied to the central processing unit, wherein said command supply device sequentially accumulates the command sequence into said second buffer except when repeatedly supplying the first command sequence to the central processing unit, when supplying the command sequence stored in the main memory to the central processing unit, and said command supply device does not further accumulate a command that follows the second partial command sequence into said second buffer, while supplying the second partial command sequence accumulated in said second buffer to the central processing unit, until an available space generated in said second buffer by supplying the second partial command sequence to the central processing unit exceeds a predetermined amount, wherein a first command is stored in the main memory, the first command including a location of the first command sequence and information for identifying the first partial command sequence as a command sequence to be accumulated in said first buffer, and said command supply device is further operable to receive an instruction based on the information included in the first command from the central processing unit which has executed the first command, and to accumulate the first partial command sequence into said first buffer according to the received instruction.

6. The command supply device according to claim 5, further comprising a register which holds the predetermined amount, wherein the predetermined amount is set up and held in said register, according to an instruction from the central processing unit.

7. A command supply control method of controlling a command supply device that includes a first buffer and a second buffer and supplies a command read out from a main memory to a central processing unit, the method comprising:

accumulating, into the first buffer, a first partial command sequence that is a head part of the first command sequence repeatedly supplied to the central processing unit from among command sequences stored in the main memory, before supplying the first command sequence to the central processing unit again;

accumulating, into the second buffer, a second partial command sequence that follows the first partial command sequence, while supplying the first partial command sequence accumulated in the first buffer to the central processing unit, when repeatedly supplying the first command sequence to the central processing unit, and supplying, to the central processing unit, a command from the second partial command sequence accumulated in the second buffer, when the entirety of the first partial command has been supplied to the central processing unit, wherein a first command is stored in the main memory, the first command including a location of the first command sequence and information for identifying the first partial command sequence as a command sequence to be accumulated in the first buffer, and a first branch command included in the first command sequence is stored in the main memory, the first branch command executing branching to a command included in the first command sequence, the command supply control method further comprising:

receiving an instruction based on the information included in the first command, from the central processing unit which has executed the first command, and accumulating the first partial command sequence into the first buffer according to the received instruction, supplying, to the central processing unit, the first partial command sequence stored in the first buffer when the first branch command has been executed by the central processing unit, and accumulating, at the same time, the second partial command sequence into the second buffer when the first branch command has been executed by the central processing unit and when the second partial command sequence is not accumulated in the second buffer.

* * * * *